(12) United States Patent
Klinker et al.

(10) Patent No.: US 8,321,433 B1
(45) Date of Patent: Nov. 27, 2012

(54) SYSTEMS AND METHODS FOR BUSINESS PROCESS LOGGING

(75) Inventors: Boris Klinker, Karlsruhe (DE); Soeren Balko, Weinheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/102,828

(22) Filed: May 6, 2011

(51) Int. Cl.
*G06F 17/30* (2006.01)
(52) U.S. Cl. .......................................... 707/754
(58) Field of Classification Search ................. 705/7.11; 707/754
See application file for complete search history.

(56) References Cited

U.S. PATENT DOCUMENTS

| | | | | |
|---|---|---|---|---|
| 5,581,691 | A * | 12/1996 | Hsu et al. | 714/15 |
| 6,038,538 | A * | 3/2000 | Agrawal et al. | 705/7.11 |
| 6,324,546 | B1 * | 11/2001 | Ka et al. | 717/170 |
| 7,908,160 | B2 * | 3/2011 | Bhargava | 705/7.11 |
| 8,024,275 | B2 * | 9/2011 | Stone | 705/301 |
| 2004/0225689 | A1 * | 11/2004 | Dettinger et al. | 707/200 |
| 2005/0044426 | A1 * | 2/2005 | Vogel et al. | 713/202 |
| 2008/0228536 | A1 * | 9/2008 | Suenbuel et al. | 705/7 |
| 2011/0035242 | A1 * | 2/2011 | Sondhi et al. | 705/7 |
| 2011/0082716 | A1 * | 4/2011 | Bhamidipaty et al. | 705/7.11 |

OTHER PUBLICATIONS

U.S. Appl. No. 12/848,679, filed Aug. 2, 2010, entitled "Framework for Ad-Hoc Process Flexibility,".
U.S. Appl. No. 13/094,366, filed Apr. 26, 2011, entitled "High-Load Business Process Scalability,".
Extended European Search Report issued in European Application No. 12003425.1 on Jul. 19, 2012; 8 pages.

* cited by examiner

*Primary Examiner* — Jorge A Casanova
(74) *Attorney, Agent, or Firm* — Fish & Richardson P.C.

(57) ABSTRACT

The present disclosure involves systems, software, and computer implemented methods for filtering business process logging information at runtime. One process includes receiving a set of logging information associated with execution of at least one entity, the at least one entity associated with a business process model defining a set of business process entities for performing a defined business process, identifying a process log filter rule associated with the entity, applying the identified process log filter rule to the received set of logging information to generate a filtered set of logging information associated with execution of the entity, and storing the filtered set of logging information in a process log associated with the execution of the entity. Identifying a process log filter rule associated with the entity can include identifying an entity property and determining at least one process log filter rule corresponding to the identified entity property.

22 Claims, 6 Drawing Sheets

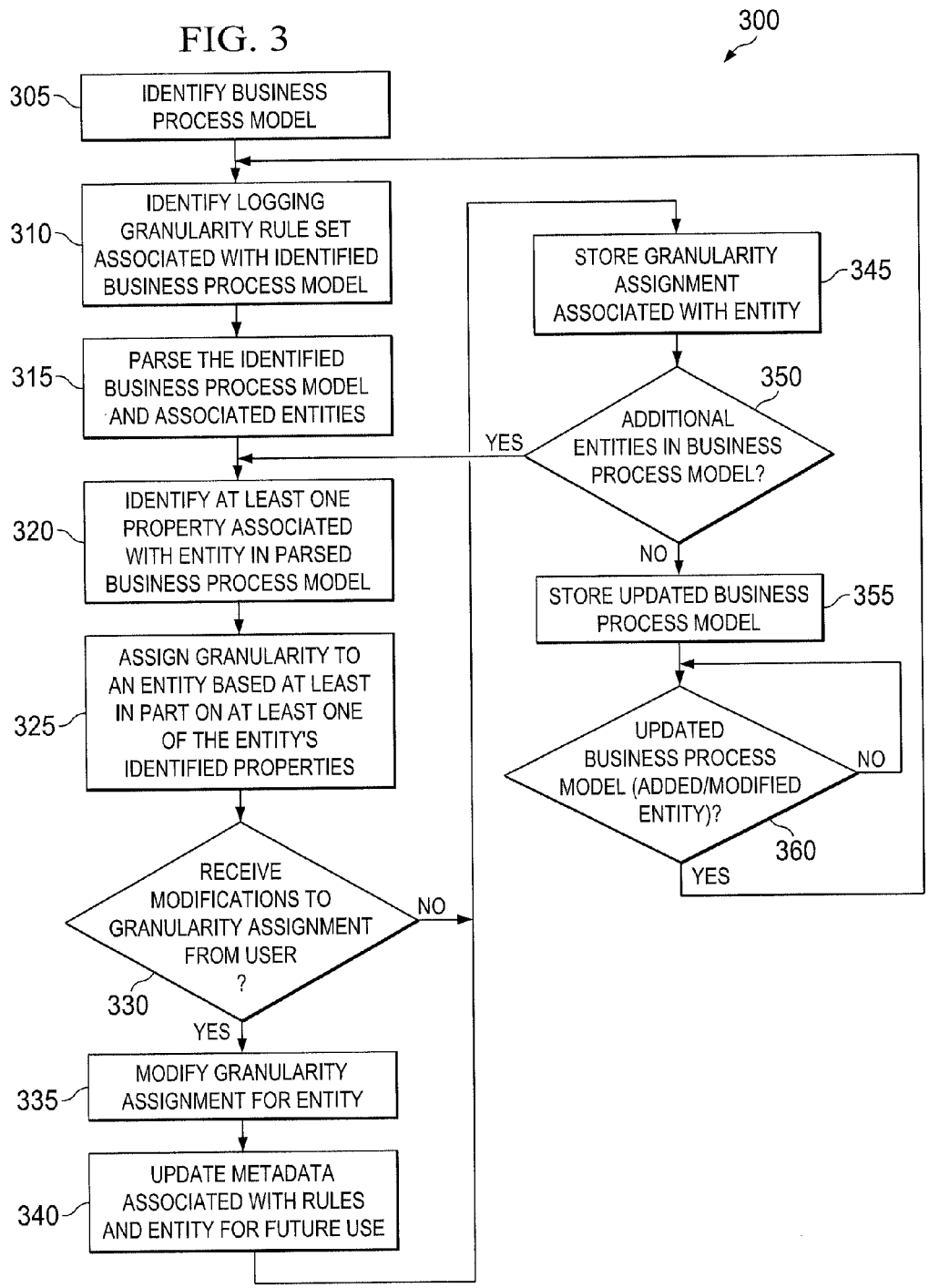

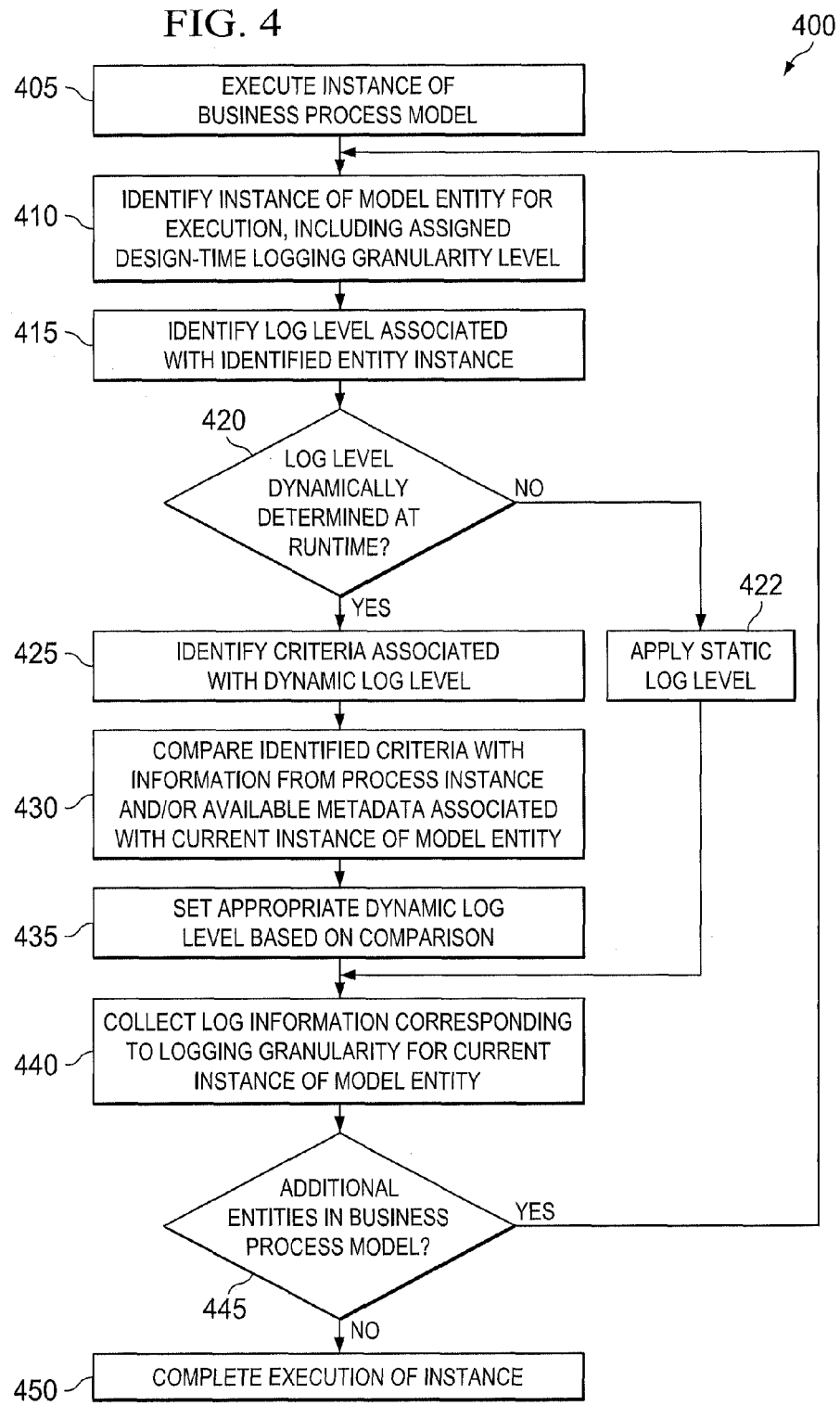

SYSTEMS AND METHODS FOR BUSINESS PROCESS LOGGING

TECHNICAL FIELD

The present disclosure relates to software, computer systems, and computer implemented methods for high-performance, purpose-driven logging for business processes.

BACKGROUND

Organizations perform operations, transactions, and business processes both within their own organization as well as across company boundaries, such as by conducting business with external entities such as business partners, distribution centers, outsourcing companies, compliance auditors, banks, and logistics providers Many business models have evolved from single enterprise business models into inter-connected and networked business models. During the course of execution, business processes record their operations in a process log. Individual process participants, entities, and users can review the process log to determine the effectiveness and success of various operations of the executed business processes.

Business process modeling notation (BPMN) is a standard for business process modeling, and can be used to design and create detailed business processes in a form generally understandable to individuals of different technical knowledge and ability. In general, the objective of BPMN is to support business process management for both technical users and business users by providing a notation that is intuitive to business users, yet capable of representing complex process semantics. Further, the BPMN specification can be used with Business Process Execution Language (BPEL) engines to provide mappings between the graphics of the notation to the underlying constructs of execution languages. In other instances, BPMN-based process execution runtimes may be used to interpret, process, and understand BPMN. Because BPMN is understandable by both technical and business users, networked business processes can be described using BPMN, providing a common point of understanding for users from different entities. The BPMN-designed business process can be associated with a logging mechanism or module in order to record the operations of the system and/or any human interactions at runtime in either the development or production runtime environment.

SUMMARY

The present disclosure involves systems, software, and computer implemented methods for filtering business process logging information at runtime. One process includes receiving a set of logging information associated with execution of at least one entity, the at least one entity associated with a business process model defining a set of business process entities for performing a defined business process, identifying a process log filter rule associated with the entity, applying the identified process log filter rule to the received set of logging information to generate a filtered set of logging information associated with execution of the entity, and storing the filtered set of logging information in a process log associated with the execution of the entity. Identifying a process log filter rule associated with the entity can include identifying an entity property and determining at least one process log filter rule corresponding to the identified entity property.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a flowchart of an example process for applying process logging granularities to one or more business process entities at design-time.

FIG. 4 is a flowchart of an example process for determining, at runtime, a dynamic process logging granularity to apply to a particular business process entity.

DETAILED DESCRIPTION

Figure 1:
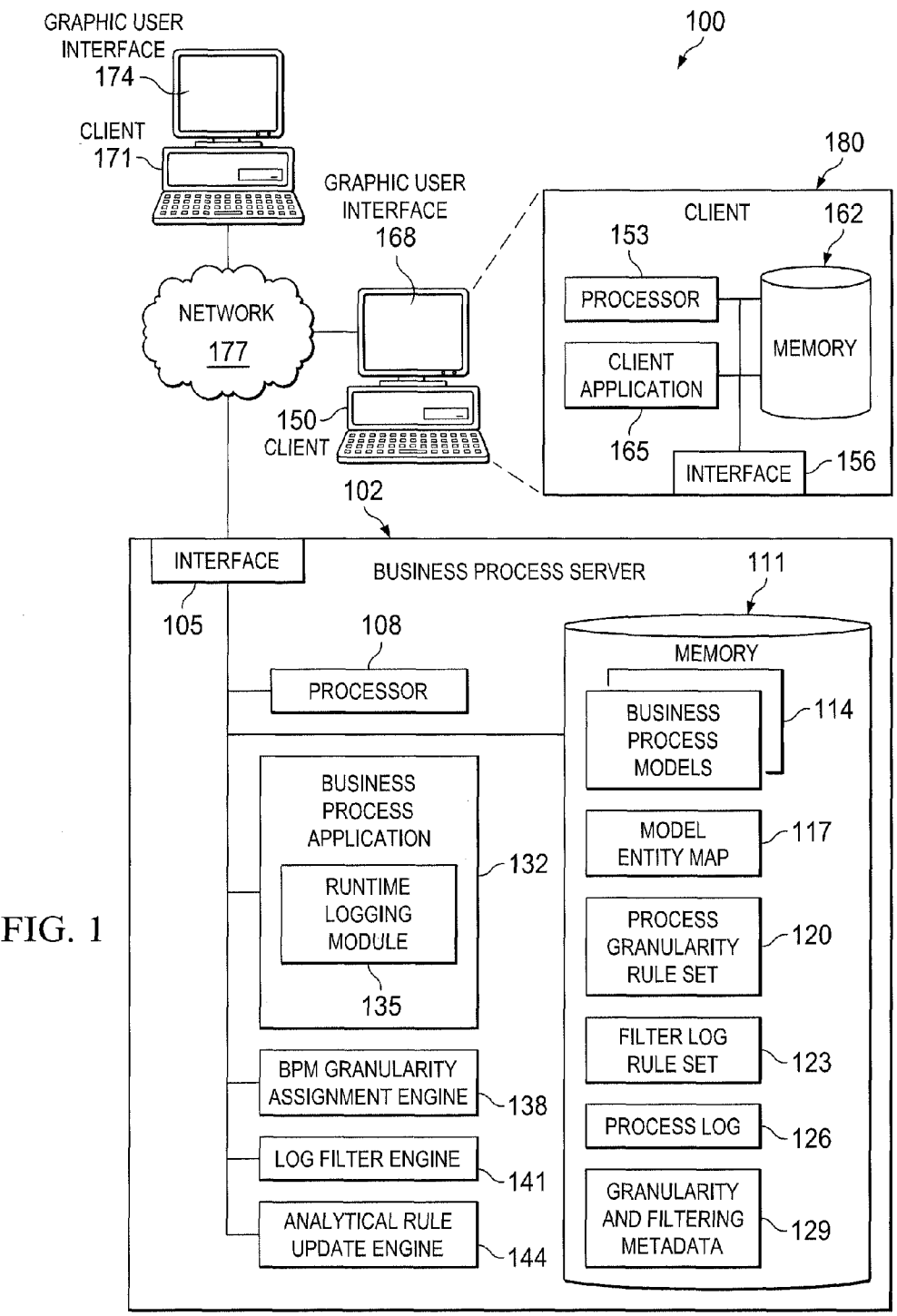
FIG. 1 illustrates an example environment for implementing various features of a system providing high-performance, purpose-driven logging for business processes.

This disclosure generally describes computer systems, software, and computer implemented methods for providing high-performance, purpose-driven logging for business processes, as well as the application of flexible filtering criteria associated with the results of the business process logging at runtime. The present disclosure provides tools and processes to enhance the logging of information generated by different types of business process entities, as well as the level, amount, detail, and/or granularity of that information that is persisted in the associated process log. Generally, a business process log allows for a post-mortem inspection of a process's execution, as well as for inspection of the execution of a "living" (i.e., not yet terminated) process instance. The information stored within the process log can be used to understand the effects that a business process has caused in connected or related applications and systems, provide an audit trace of how the process and its entities performed, detect errors and unexpected behavior that occurred during the execution of the business process, identify resources consumed by the process, review user interactions, and confirm the timely order of executed process steps. In some systems, a single level of process logging granularity may be provided for a business process, such that similar levels and depths of information are collected for each entity executed in association with the business process itself. In some instances, however, the level of granularity required in a particular business process entity (or business process as a whole) can differ from, among others, other processes, process entities, process instances. Additionally, the purposes for which the process log is being used can also determine the level of information needed to be produced by the logging process in order to properly perform that purpose. For different purposes, the level of process logging granularity may differ, including the frequency, number, and level of detail of the logged business process events. Moreover, a process-specific logging granularity may also depend on other influences such as the currently processed business process entity (i.e., activities, gateways, events, etc.), the semantic process fragment associated with the executing business process, or other context-relevant parameters. While a fine level of process logging granularity can provide a complete process log and/or execution trail for the entire business process, the fine level of process logging granularity can be the cause of additional issues in the underlying system, including several performance-related penalties. For example, database space consumption for storing log entries and process execution speed both suffer when all entities within a business process are logged at a fine granularity. Additionally, assembling and preparing information for logging purposes may consume significant runtime resources, including CPU cycles and main memory. Therefore, the total cost of ownership (TCO) of the system is increased without being justified by the actual requirements needed of the process log.

The present disclosure addresses these issues in part by providing a mechanism and tool that can automatically assign different process logging granularities to different entities within a business process instance based on a combination of design-time and runtime determinations associated with the business process instance as a whole, as well as one or more sets of rules and determinations associated with the individual business process entities themselves. In addition to the automatic assignment of the various logging granularities, users and administrators with the appropriate level of access can manually modify the automatic assignments according to the specific needs or interests of a particular business process instance. In some instances, these changes can be monitored and used as feedback to further modify the one or more sets of rules associated with the automatic assignments, thus providing a learning element to the present disclosure.

The tools of the present disclosure provide two levels of process logging enhancement. First, a design-time based granularity concept is introduced for business process models (BPMs) and their associated entities. BPM entities, for example, are associated with a particular granularity level at design-time based on one or more attributes and information associated with entities prior to the business process instance being executed. Various levels of logging granularities may be provided, such as low, medium, and high levels of granularity, or severity-based levels of granularity, such as "information," "warning," and "error." Additional and different levels of granularity can be assigned or used in various implementations, including greater or fewer than three levels as described in the example. The granularity determination can be automatically derived from an underlying meta model entity assignment (based on one or more rules associated with the associated BPM), while automatically derived granularities—derived based on information available in the process model, such as a process entity type (e.g., activity, event, gateway, etc.) and other attributes—can be manually modified and overridden by technical personnel or users associated with the particular business process. Different types of operations may be associated with different granularities as appropriate. For example, a decision gateway entity may be associated with a low level of process logging granularity, as the decision gateway may have few consequences or related actions associated with it. Conversely, a user task with direct impact on the execution of a particular business process instance may be associated with a high granularity level of process logging in order to insure the ability of users and administrators to later review the operations and effects of the user task, such as for auditing purposes. In some instances, the process logging granularity may be assigned as a dynamic set of values to be finally determined at runtime depending on one or more runtime context-specific values. For example, if a user task results in a particular input/output A, the granularity of the associated user task may be set as "medium," while if the user task results in a particular input/output B, the granularity of that task may be set as "high." In other words, at design-time a severity or level of granularity is determined. That determination can be a static assignment or may take into account model data. At runtime, that severity or granularity level is matched against a log level that may be assigned to a process instance or computed from a user-defined rule.

As a second part, the tools described by the present disclosure further provide for configuring a logging level in the business process management suite (BPMS) runtime that acts as an additional filter for different logging granularities, or for particular information included within the logged information. In particular, the runtime filter determines whether or not an event will be logged based on the fact of whether the severity or logging granularity (of the process entity that has caused the logging event) is greater or equal to a predetermined and/or predefined value or log level. The runtime log level filter may be based on a second set of rules or information received or applied after the initial process logging granularity assignment has been made. The runtime filter's log level can be used to adapt the logging of different instances of the same business process to a particular runtime environment or for a particular user. In one example, the runtime filter's associated log level can be adapted to only store information when a predefined parameter associated with a business entity's logging information is met, such as when a particular set of logged information corresponds to a particular set of error-related information or categories. In general, the log level of the runtime filter can be static or can be dynamic at runtime based on information associated with the log level and the logging information received.

The two approaches—(1) the design-time logging granularities/severities applied to a process model or instance and (2) the log level runtime filter applied to a particular process instance and logging event)—are generally applied separately, although they can be applied in a complementary manner in order to apply a particular process logging granularity at design-time while further refining the amount of information collected at runtime. The first approach can reduce the data volume initially recorded or monitored for a particular business process entity, while the second approach can reduce the frequency of logging information stored in the associated database or data warehouse, thereby benefiting the overall logging and system performance. In one instance, a combination of the approaches may include (1) a pure filter that results in a yes/no decision whether an event shall be logged and (2) a determination on the level of detail that goes into the log for a particular event.

Log levels can be configured in different manners. For example, the same logging level can be applied to the entities within (1) all business processes associated with a particular BPMS, (2) a specific business process template or version, or (3) a specific business process instance. Alternatively, log levels may be defined on a level of the component hierarchy (i.e., where process templates are organized into different projects or packages), with different types of log levels propagating down through an entire component sub-tree or nested components and actions. Further, the log level may be derived from a process-usage dependency, where a sub-flow inherits its logging level from its parent flow. Additionally, the log level for a particular entity can be determined from a specific business rule that can operate on any available contextual data, including the process template, the data context, the involved persons or systems interacting with a particular process instance, as well as other suitable information. Both the initial log level provided at design-time and the runtime filter applied at runtime can be associated with all or a portion of the business process in different implementations, including different instances of the same business process.

The advantages of the present disclosure are numerous. First, the tools described herein allow for an automatic assignment of default logging granularities or severities at design-time based on pre-defined rules or rule sets that can apply the information defining a business process and its associated entities to one or more rules to determine the logging granularity or severity level associated with the events defined in the business process. Further, the automatic assignment of the default logging granularities can be manually modified by an appropriate user or entity in order to customize particular business processes (with the logging requirements as needed. The manual modifications can also be incorporated into a learning mechanism that can be used to update one or more of the pre-defined rules for future use in some implementations. The runtime filter can purge and/or limit the amount of detail associated with log entries to be stored in the process log, thus reducing database volume growth and improving overall performance. In one example, the runtime filter may execute rules to remove confidential information (i.e., credit card numbers, etc.) from the events that are not to be logged, such as when legal regulations forbid such action. The solution collectively addresses a variety of logging use-cases, including error-search, audit trails, and tracing, among others, and can provide a more user-friendly process log based on the focused set of information to be stored in the process log.

FIG. 1 illustrates an example environment 100 for implementing various features of a system providing high-performance, purpose-driven logging for business processes. The illustrated environment includes, or is communicably coupled with, at least one business process server 102 and one or more clients 150, 171. At least some of the clients 150, 171 and the business process server 102 may communicate across or via network 177. In general, environment 100 depicts an example configuration of a system capable of providing purpose-driven business process logging processes providing higher system performance and more focused business process logging capabilities. In alternative implementations, the elements illustrated within the business process server 102 and/or the clients 150, 171 may be included in or associated with different and/or additional servers, clients, networks, or locations other than those illustrated in FIG. 1. For example, the components illustrated within the business process server 102 may be included in multiple servers, cloud-based networks, or other locations accessible to the business process server 102 (e.g., either directly or via network 177).

In general, the business process server 102 is any server that stores and executes business processes via one or more business process applications 132, where the business process applications 132 are associated with at least one instance of a business process model 114. For example, each server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each business process server 102 may store a plurality of various other applications, while in other instances, each business process server 102 may be a dedicated server meant to store and execute a particular business process application 132 and its related functionality, as well as a set of particular business process applications 132. In some instances, the business process server 102 may comprise a web server or be communicably coupled with a web server, where the particular business process application(s) 132 associated with that server 102 represents a web-based (or web-accessible) application accessed and executed on one or more of the associated clients 150, 171 to perform the programmed tasks or operations of the corresponding business process application(s) 132, as well as to provide user interactions with a business process.

At a high level, the business process server 102 comprises an electronic computing device operable to receive, transmit, process, store, or manage data and information associated with the environment 100. The business process server 102 illustrated in FIG. 1 can be responsible for receiving application requests from one or more clients 150, 171 (as well as any other entity or system interacting with the business process server 102), responding to the received requests by processing said requests in the associated business process application 132, and sending the appropriate responses from the business process application 132 back to the requesting client 150, 171 or other requesting system. The business process application 132 can also process and respond to local requests from a user locally accessing the associated business process server 102. Accordingly, in addition to requests from the external clients 150, 171 illustrated in FIG. 1, requests associated with a particular business process application 132 may also be sent from internal users, external or third-party customers, and other associated business process applications, as well as any other appropriate entities, individuals, systems, or computers. In some instances, the business process application 132 may be a web-based application executing functionality associated with the networked or cloud-based business process.

As used in the present disclosure, the term "computer" is intended to encompass any suitable processing device. For example, although FIG. 1 illustrates a single business process server 102, environment 100 can be implemented using any number of servers, as well as computers other than servers, including a server pool. Indeed, the business process server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated business process server 102 may be adapted to execute any operating system, including Linux, UNIX, Windows, Mac OS, or any other suitable operating system.

In the illustrated implementation of FIG. 1, the business process server 102 includes an interface 105, a processor 108, a memory 111, and a business process application 132. The illustrated business process server 102 further includes several additional components, including a business process model granularity assignment engine 138, a log filter engine 141, and an analytical rule update engine 144. In some instances, the business process server 102 and its components may be physically separated into a design-time tool (of which the granularity assignment engine 138 is a part of) and a runtime engine (of which the log filter engine 141 is a part of).

While illustrated as a single component in the example environment 100 of FIG. 1, alternative implementations may illustrate the business process server 100 as comprising multiple parts or portions accordingly.

The interface 105 is used by the business process server 102 to communicate with other systems in a client-server or other distributed environment (including within environment 100) connected to the network 177 (e.g., an associated client 150, 171, as well as other systems communicably coupled to the network 177). FIG. 1 depicts both a server-client environment, but could also represent a cloud computing network. Various other implementations of the illustrated environment 100 can be provided to allow for increased flexibility in the underlying system, including multiple business process servers 102 performing or executing one or more additional or alternative instances of the business process application 132, as well as other applications associated with or related to the business process application 132. In those instances, the different business process servers 102 may communicate with each other via a cloud-based network or through the connections provided by network 177. Returning to the illustrated environment, the interface 105 generally comprises logic encoded in software and/or hardware in a suitable combination and operable to communicate with the network 177. More specifically, the interface 105 may comprise software supporting one or more communication protocols associated with communications such that the network 177 or the interface's hardware is operable to communicate physical signals within and outside of the illustrated environment 100.

Generally, the business process server 102 may be communicably coupled with a network 177 that facilitates wireless or wireline communications between the components of the environment 100 (i.e., between the business process server 102 and one or more of the clients 150, 171), as well as with any other local or remote computer, such as additional clients, servers, or other devices communicably coupled to network 177, including those not illustrated in FIG. 1. In the illustrated environment, the network 177 is depicted as a single network, but may be comprised of more than one network without departing from the scope of this disclosure, so long as at least a portion of the network 177 may facilitate communications between senders and recipients. In some instances, one or more of the components associated with the business process server 102 may be included within the network 177 as one or more cloud-based services or operations. The network 177 may be all or a portion of an enterprise or secured network, while in another instance, at least a portion of the network 177 may represent a connection to the Internet. In some instances, a portion of the network 177 may be a virtual private network (VPN). Further, all or a portion of the network 177 can comprise either a wireline or wireless link. Example wireless links may include 802.11a/b/g/n, 802.20, WiMax, and/or any other appropriate wireless link. In other words, the network 177 encompasses any internal or external network, networks, sub-network, or combination thereof operable to facilitate communications between various computing components inside and outside the illustrated environment 100. The network 177 may communicate, for example, Internet Protocol (IP) packets, Frame Relay frames, Asynchronous Transfer Mode (ATM) cells, voice, video, data, and other suitable information between network addresses. The network 177 may also include one or more local area networks (LANs), radio access networks (RANs), metropolitan area networks (MANs), wide area networks (WANs), all or a portion of the Internet, and/or any other communication system or systems at one or more locations. The network 177, however, is not a required component in all implementations of the present disclosure.

As illustrated in FIG. 1, the business process server 102 includes a processor 108. Although illustrated as a single processor 108 in the business process server 102, two or more processors may be used in the business process server 102 according to particular needs, desires, or particular embodiments of environment 100. The processor 108 may be a central processing unit (CPU), a blade, an application specific integrated circuit (ASIC), a field-programmable gate array (FPGA), or another suitable component. Generally, the processor 108 executes instructions and manipulates data to perform the operations of the business process server 102 and, specifically, the functionality associated with the corresponding business process application 132. In one implementation, the server's processor 108 executes the functionality required to receive and respond to requests and instructions from the one or more clients 150, 171, as well as the functionality required to perform the operations of the associated business process application 132, the BPM granularity assignment engine 138, the log filter engine 141, and the analytical rule update engine 144.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 108 executes the corresponding business process application 132 stored on the associated business process server 102. In some instances, a particular business process server 102 may be associated with the execution of two or more business process applications 132, as well as one or more distributed applications executing across two or more business process servers 102.

At a high level, each business process application 132 is any application, program, module, process, or other software that may execute, change, delete, generate, or otherwise manage information associated with a particular business process server 102, and in some cases, a business process performing and executing business process-related events. In particular, business processes communicate with other users, applications, systems, and components to send and received events. In some instances, a particular business process application 132 may operate in response to and in connection with one or more requests received from an associated client 150, 171. Additionally, a particular business process application 132 may operate in response to and in connection with one or more requests received from other business process applications 132, including a business process application associated with another business process server 102. In some instances, each business process application 132 may represent a web-based application accessed and executed by remote clients 150, 171 via the network 177 (e.g., through the Internet, or via one or more cloud-based services associated with the business process application 132). Further, while illustrated as internal to the business process server 102, one or more processes associated with a particular business process application 132 may be stored, referenced, or executed remotely. For example, a portion of a particular business process application 132 may be a web service associated with the business process application 132 that is remotely called, while another portion of the business process application 132 may be an interface object or agent bundled for processing at a remote client 150, 171. Moreover, any or all of a particular business process application 132 may be a child or sub-module of another software module or enterprise application (not illustrated) without departing from the scope of this disclosure. Still further, portions of the particular business process application 132 may be executed or accessed by a user working directly at the business process server 102, as well as remotely at a corresponding client 150, 171. The business process application 132 is illustrated as including a runtime logging module 135. The runtime logging module 135 performs the operations associated with collecting and storing the process logging information generated during the execution of a particular business process instance.

While the business process application 132 can be represented in any suitable notation, many business process applications 132 can be represented in Business Process Modeling Notation (BPMN), as illustrated in FIG. 2. BPMN (current version 2.0) provides well-known graphical notations for events, activities, decisions, resources, role/user assignments, control flow, message flow, data flow, and other items performed within or associated with a particular overall process. BPMN is not necessarily tied to a particular underlying programming language, and may be used with any suitable programming language including JAVA, ABAP, or C++, among others. Some business process servers 102 can execute BPMN natively, or without translating a BPMN-based process model into another programming language.

Figure 2A:
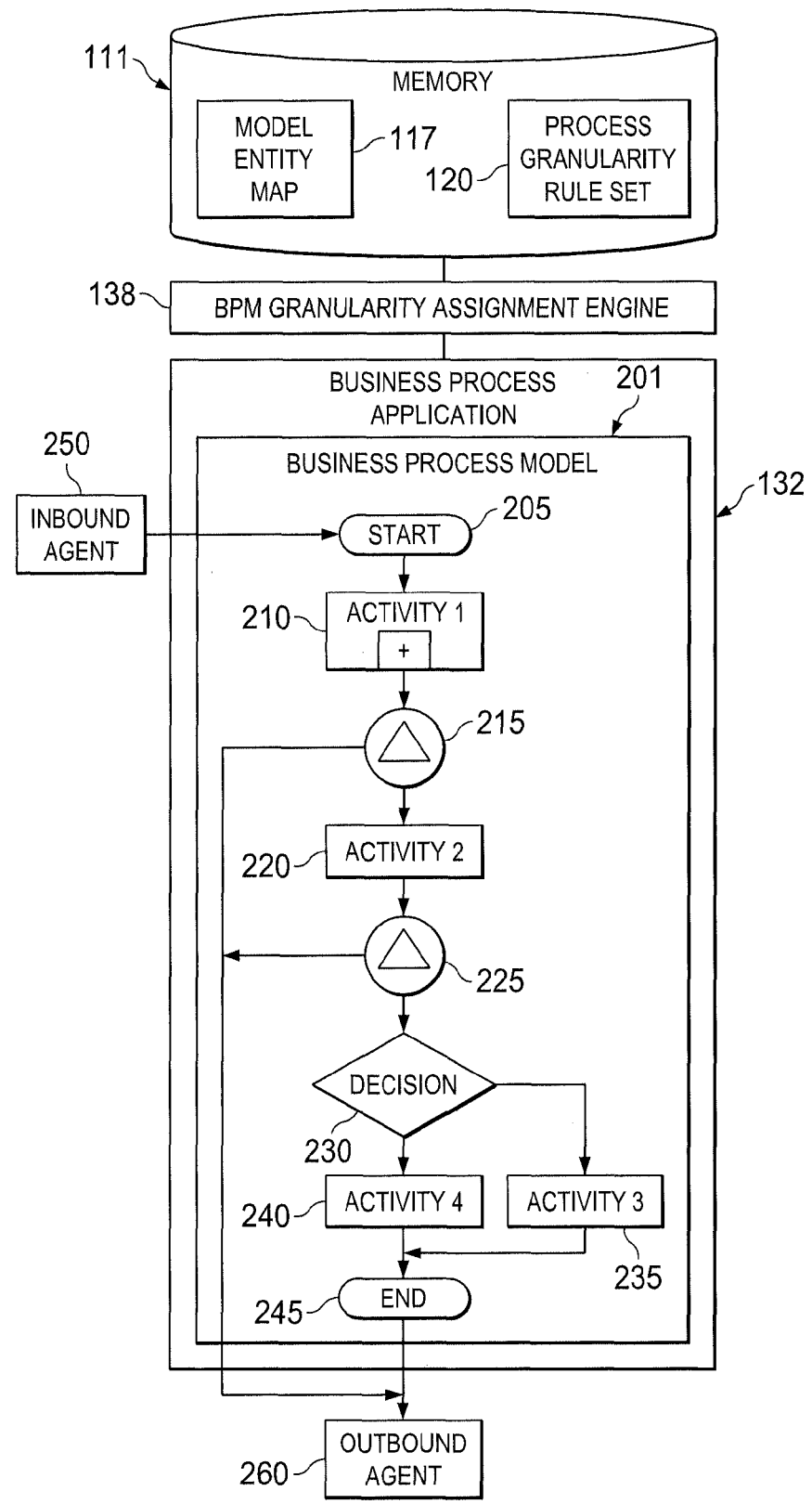
FIG. 2A illustrates a block diagram of an example business process illustrated in Business Process Model Notation (BPMN) prior to an automatic assignment of particular logging granularities to one or more of the business process entities in a suitable system, such as the system described in FIG. 1.
Figure 2B:
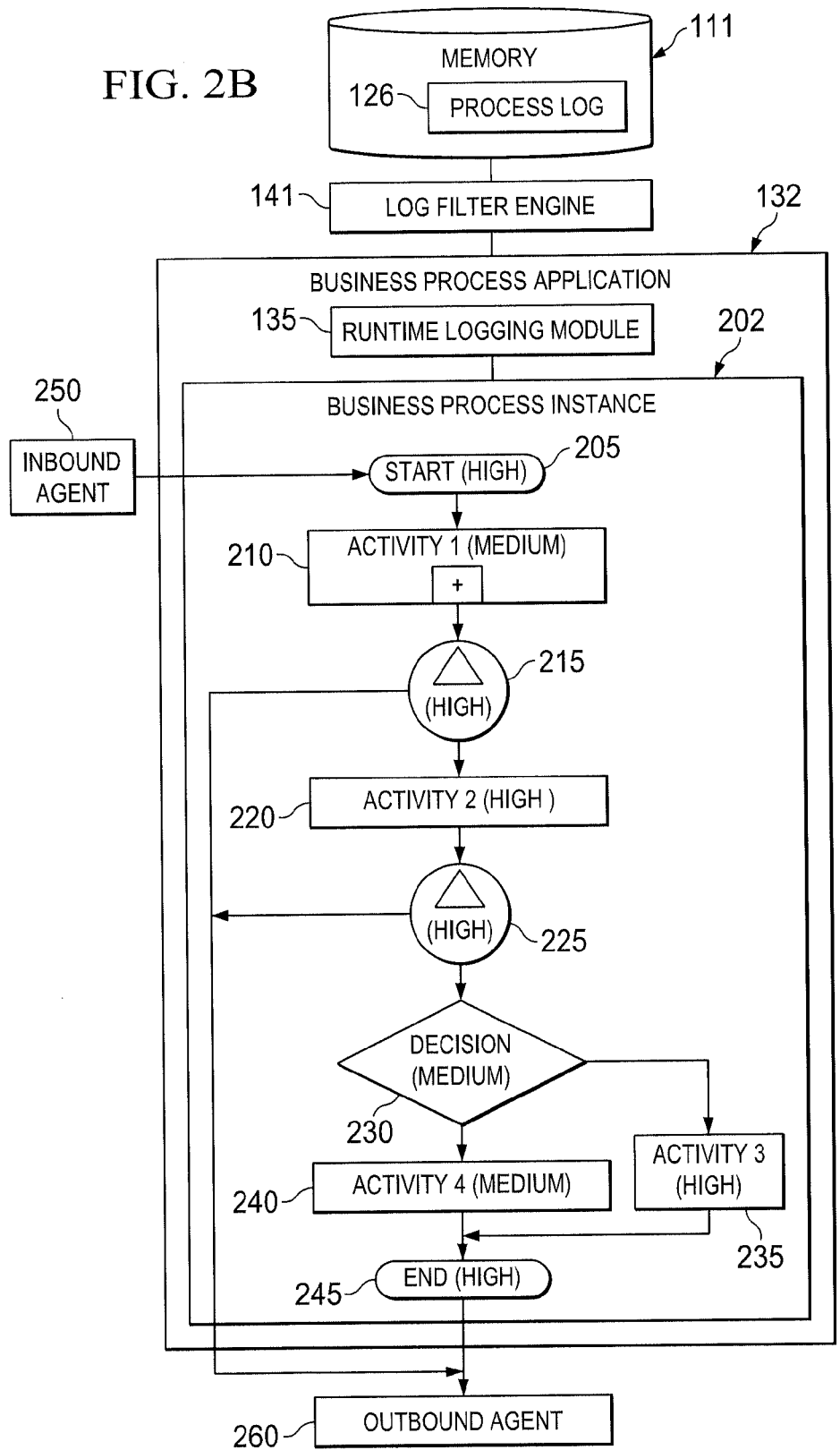
FIG. 2B illustrates a block diagram of the example business process illustrated in FIG. 2A after a set of logging granularities has been assigned to the various business process entities of the example business process.

FIGS. 2A-B specifically illustrates an example business process application 132 that includes a business process instance 201. The business process instance 201 includes a business process model represented by various graphical elements that are part of the BPMN standard. A start event 205 associated with the illustrated business process instance 201 is triggered to begin the business process instance 201. As illustrated, an inbound agent 250 may interpret information received from an internal or external source (including another business process application 132, a user associated with the business process server 102, etc.) to trigger the start event 205 and initialize the business process instance 201.

After the start event 205 is triggered, a first activity 210 is performed. An activity in BPMN, such as the first activity 210, represents specific work or processes to be performed within the modeled business process or instance. In the illustrated example, the first activity 210 includes at least one nested event or process (as shown by the "+" sign below the activity label). In some instances, the nested event or process can include a plurality of various graphical elements, themselves representing one or more additional sub-flows, sub-processes, or other events associated with the first activity 210.

Next, the data associated with or results of the first activity 210 are provided to an intermediate event 215. Intermediate events represent an event that occurs between the start and end event, and can provide an opportunity for a business process to send information outside the business process or receive information from outside the business process prior to the corresponding end event. For example, and as illustrated in FIG. 2A, the intermediate event 215 may be associated with a particular signal or message that is provided to an outbound agent 260, where the outbound agent 260 directs the outgoing signal or message to the appropriate location. Within environment 100, the outbound agent 260 may process the signal or message provided by the intermediate event 215 and send that information to a related business process or other activity outside the business process model 201 for further processing. In other instances, the outbound agent 260 may send the signal or message directly to another business process instance executing in the same (or another) business process application 132, either on or remote from the business process server 102. In some instances, a second inbound agent (not illustrated) may provide additional information to the business process model 201 at the intermediate messaging event 215, such that the intermediate messaging event 215 represents a "catching" intermediate messaging event 215, as opposed to the "throwing" or "sending" intermediate messaging event 215, as illustrated in FIG. 2A.

Upon performing the operations of the intermediate event 215, the business process model 201 continues at the second activity 220, where additional processing or operations are performed. Business process model 201 includes a second intermediate event 225 after the second activity 220, where, again, information associated with the current status and state of the business process model 201 is provided to the outbound agent 260. In some instances, the signal or message sent by the intermediate event 225 can be sent to the same location as the prior intermediate event 215, or a different location or recipient. In some instances, the signal or message can be sent to the same location, but relayed to a different recipient.

After the second intermediate event 225, a decision step 230 is provided. The decision step 230 may also be called a gateway, and can be used to determine, based on the data flow within the associated business process model 201, how to fork, split, or otherwise direct the control flow of the business process model 201. In some instances (not illustrated here), gateways may be used to merge separate flows in a business process instance 201, such as when concurrently performed operations are combined to perform another activity. Based on the conditions received at the decision step 230, the business process model 201 continues at either the third activity 235 or the fourth activity 240. In other instances, however, the decision step 230 may represent a gateway step, instead causing two separate threads of processing to occur such that both the third activity 235 and the fourth activity 240 are performed. Once the operations associated with the correct activity are performed (or, where appropriate, both activities are performed), the business process model 201 completes the business process at end event 245. The end event 245 represents the result of a process, and similar to an intermediate event, can return the results of the process. In the current example, the end event 245 presents the results of the process to the outbound agent 260, which can then forward those results to any suitable location or recipient. In some instances, multiple outbound agents may be used in place of the single illustrated outbound agent 260.

Returning to FIG. 1, additional modules including the BPM granularity assignment engine 138, the log filter engine 141, and the analytical rule update engine 144 are illustrated within the business process server 102. All, some, or none of the modules may be included in other business process servers 102. Additionally, some or all of the modules may be combined with each other, as well as integrated into the functionality provided by another component. The BPM granularity assignment engine 138 interacts with the business process application 132 to assign particular logging granularities to different business process instances associated with one or more business process models 114 that are instantiated at and executed by the business process application 132. The BPM granularity assignment engine 138 accesses a process granularity rule set 120 stored in memory 111, identifies the entities in a particular business process model 114, and assigns one or more levels of process logging granularity to the entities included within that business process model 114 at design-time. The operations of the BPM granularity assignment engine 138 are generally performed at design-time as a design time component. The levels of logging granularity can vary between implementations. In some instances, multi-level logging granularities can include low, medium, and high, and can be based on the relative importance of particular entities included within a business process model 114. In other instances, the logging granularities can be associated on the severity of the particular entity's effect on the business process. In those instances, the logging granularities may correspond to the levels of "information," "warning," and "error." The various levels of logging granularity may determine the amount and type of information collected at each entity at runtime. For example, a lower level of granularity may include general information, such as the entity's name and/or ID, as well as information on whether its operations were successful. Higher levels of granularity may provide more in-depth and detailed information for the executed entity or element in order to provide additional logging information associated with those entities assigned the higher logging granularity.

In some instances, the process granularity rule set 120 may define a specific process logging granularity for each entity (or element) within a particular business process model 114. The process granularity rule set 120 may be used by the granularity assignment engine 138 in connection with a model entity map 117 (illustrated in memory 111) that can provide a description or additional information and various entity types and/or metadata associated with particular entities. The process granularity rule set 120 may be compared against the information defining a particular entity within the model entity map 117, allowing the granularity assignment engine 138 to determine and assign a corresponding logging granularity to the associated entity instance. Alternatively, the process granularity rule set 120 can be used to apply a particular level of logging granularity to an entire business process model 114 or a specific business process model template or version. Still further, different types of entities (i.e., activities, user tasks, messaging events, gateways, decisions, etc.) can be associated with different process logging granularities, such that the BPM granularity assignment engine 138 can parse a particular business process model 114 and assign different levels of granularity to each entity that the granularity assignment engine 138 identifies. In some instances, the granularity assignment engine 138 (or another component) can provide an interface for users or administrators to modify or override one or more granularity assignments made by the engine 138 via one or more of the clients 150, 171 or through a local interface at the business process server 102.

The business process server 102 further includes the log filter engine 141. The log filter engine 141 can be used at runtime prior to logging information being stored in the process log 126 (within memory 111). For example, the log filter engine 141 may be associated with a second set of rules determining which of the logged information associated with a particular entity and business process instance to persist to the process log 126. By providing this additional filter, the amount of data stored in the process log 126 can be limited to the information pertinent or related to a particular runtime or business process instance. Additionally, the data stored in the process log can be further limited based on the second set of rules to store less information in the process log to improve performance and occupy less storage space. The log filter engine 141 may be located so as to intercept the information collected by the runtime logging module 135 of the business process application 132. In other words, the collected logging information is passed through the log filter engine 141 prior to the information being stored in the process log 126. The log filter engine 141 can access a filter log rule set 123 associated with the current business process instance associated with the business process application 132 to determine a subset of the information to be stored in the process log 126.

Different types of filters may be applied by the log filter engine 141 (and included in the filter log rule set 123). In one instance, a static filter can be applied to the business process instance logging data collected at runtime. The static filter can compare the defined logging granularity provided or determined at design time (i.e., based on the business process model 114 and the process granularity rule set 120) with the defined log level for the runtime filter in order to determine which of the actual set of logging information returned during execution of the business process instance and its entities is to be stored in the process log at runtime. For example, where the logging granularity levels assigned at design time are low, medium, and high, a particular entity within the business process instance may be assigned a logging granularity of "medium." The static rule set can provide log filtering based on a comparison of the granularity assigned to a particular business process entity (or to the business process itself) with a runtime filter rule. In one example, the static filter rule associated with a particular business process instance may be set to "low." In those instances, the log filter engine 141 will compare entities from the business process instance associated with a "medium" granularity with a "low" level of granularity, with the result that none of the logged information associated with a particular "medium" entity will be stored in the process log 126. In those instances, only "high" granularity entities will have their logging information stored in the process log. In a different example, the runtime filter rule may be set to "medium." In those examples, where an entity has a granularity level of "medium," the log filter engine 141 will store the logging information of the "medium" entity in the process log 126, although "low" granularity levels will not be logged. In a third example, where the runtime rule is configured as "high," all activities will be logged in order to provide a complete set of information about a particular business process instance's execution, including those granularities that are lower than the runtime rule.

Various types of filters and filter log rule sets 123 can be used or applied in a system. In some instances, rules may be individually defined for particular entities or types of entities. For instance, activities may be provided a "high" runtime logging level (i.e., where all information is collected), while decisions/gateways are provided a "low" runtime logging level (i.e., where only those decisions/gateways with a "high" design-time logging granularity have their information stored in the process log 126). In some instances, the filter log rule set 123 may act to reduce the amount of information stored for a particular entity based on the entity type. In other words, while some information is stored in the process log 126, only the most important information associated with the entity (and/or the information as determined by the filter log rule set 123) will be stored in the process log 126. In other instances, logging levels may be applied to the individual entities at design time and a set runtime logging level may be applied to an entire process instance.

In other instances, one or more dynamic runtime filters can be applied to logging data received through the log filter engine 141. Process instances and their associated entities may be associated with data objects containing information associated with the runtime context of the business process instance, a particular entity, and/or the environment as a whole. The data objects can be filled at runtime with information pertinent to the current runtime situation in a system. The filter log rule set 123 may define one or more logical expressions (or other dynamic determinations) associated with different types of data and contextual information retrieved from the data objects and/or other runtime locations in order to determine the appropriate filtering log level or amount to determine whether a set (or portion) of logging information should be stored within the process log 126 at runtime. An example expression used in a dynamic filter may correspond to where a particular field contains a particular customer or event ID, allowing analysts, administrators, and other users to identify specific information for tracing and analysis. The type of (and particular) filter to be applied (dynamic v. static, as well as other variations) can be determined on an entity-by-entity basis according to the filter log rule set 123, as well as based on a particular business process instance, or other information derived at runtime.

The business process server 102 further includes the analytical rule update engine 144. The analytical rule update engine 144 identifies manual changes and modifications made by users to the automatically assigned logging granularities and filters applied to a particular business process instance. The analytical rule update engine 144 can then analyze those changes and their frequency to determine if the underlying process granularity rule set 120 and/or the filter log rule set 123 are to be modified. The analytical rule update engine 144 can use information on the modifications stored in the granularity and filtering metadata component 129 of memory 111. In some instances, information on changes to automatically assigned values can be stored in the granularity and filtering metadata component 129 by either the granularity assignment engine 138 or the log filter engine 141, while in other instances, the analytical rule update engine 144 can update and define the associated metadata 129. The analytical rule update engine 144 can collect the manual updates and, once the frequency of those updates reach a predetermined threshold (in raw numbers or based on a percentage of changes), the analytical rule update engine 144 can modify the corresponding rule set 120, 123. In some instances, once a user modified the log level of a process instance, or does so indirectly by changing the rules that in turn determine the log level, the information on the changed log level can be immediately propagated to all affected process instances in order to provide consistency throughout a system.

The business process server 102 also includes a memory 111 for storing data and program instructions. The memory 111 may include any memory or database module and may take the form of volatile or non-volatile memory including, without limitation, magnetic media, optical media, random access memory (RAM), read-only memory (ROM), removable media, or any other suitable local or remote memory component. The memory 111 may store various objects or data, including classes, frameworks, applications, backup data, business objects, jobs, web pages, web page templates, database tables, process contexts, repositories storing services local to the business process server 102, and any other appropriate information including any parameters, variables, algorithms, instructions, rules, constraints, or references thereto associated with the purposes of the server 102 and its business process application 132. In some implementations, including a cloud-based system, some or all of the memory 111 may be stored remote from the business process server 102, and communicably coupled to the business process server 102 for usage. As illustrated, memory 111 includes a set of business process models 114, the model entity map 117, the process granularity rule set 120, the filter log rule set 123, the process log 126, and the granularity and filtering metadata 129.

Returning to FIG. 2A, the business process application's association with the BPM granularity assignment engine 138 is illustrated. The granularity assignment engine 138 accesses a particular business process model 201 at design time to parse the business process entities included therein, and to compare those entities to the model entity map 117 (providing a description of each entity or entity type and its associated metadata) and the process granularity rule set 120 to determine the appropriate logging granularities to be assigned. FIG. 2B illustrates an example of a particular business process instance 202 after the BPM granularity assignment engine 138 has assigned a set of various logging granularities to the underlying business process model 201. The particular granularity assignments for the various entities are based on the determinations and assignments made at design-time by the BPM granularity assignment engine 138 as described and illustrated in FIG. 2A.

In FIG. 2B, different entities within the illustrated business process instance 202 have been assigned different logging granularities. For example, the start event 205 has a logging granularity of "High," the first activity 210 has a logging granularity of "Medium,", the first and second intermediate events 215, 225 have "High" logging granularities, the second activity 220 has a "High" logging granularity, decision 230 has a logging granularity of "Medium," the third activity 235 has a logging granularity of "High," the fourth activity 240 has a logging granularity of "Medium," and the end event 245 has a logging granularity of "High."

As described in FIG. 2B, the first activity 210 of the illustrated business process instance 202 includes at least one nested event or process from the business process model 201. In some instances, each of those nested events or processes included as part of the first activity 210 may be assigned the same or different logging granularity levels as the first activity 210. In some instances, the logging granularity levels may be applied to a particular hierarchy level within the business process model 201 or instance 202, with lower (or children) processes receiving the same logging granularity level as the higher (or parent) processes or entities. In other instances, one or more of the nested events or processes may be provided a different logging granularity level than the first activity 210 (as determined by the granularity assignment engine 138 illustrated in FIG. 2A).

FIG. 2B further illustrates a portion of the components operating at runtime during the execution of the business process instance 202, particularly the components used to filter the logging information associated with the executed business process instance 202. The runtime logging module 135 can be used by the business process application 132 to monitor and collect the logging information from the various entities included within the illustrated business process instance 202. The runtime logging module 135 can generally return the logging information to the process log 126 illustrated in memory 111. As illustrated in FIG. 2B, however, the information collected by the runtime logging module 135 are provided to the log filter engine 141 before any information is stored within the process log 126. The log filter engine 141 receives (or intercepts) the information and filters the logging information based on one or more rules (defined in the filter log rule set 123) and a determination of which rules apply to a particular runtime instance. Similar to the assigned logging granularity levels, different filters can be applied to different runtime instances based on runtime information, including user information, process-related metadata, and other factors, including the user, individual, or entity associated with a particular business process instance's execution.

FIG. 3 is a flowchart of an example process 300 for applying process logging granularities to one or more business process entities at design-time. For clarity of presentation, the description that follows generally describes method 300 in the context of environment 100 illustrated in FIG. 1. However, it will be understood that method 300 may be performed, for example, by any other suitable system, environment, or combination of systems and environments, as appropriate.

At 305 a business process model is identified. In some instances, identifying a business process model can include receiving a request from a user or other entity to create or execute a particular instance of a business process model, such as business process model 201 and business process instance 202 of FIGS. 2A-B. The design-time for modeling a business process model 201 and the runtime for executing an instance 202 of the business process model 201 may be separately defined. For example, a business process model 201 may be deployed to a particular runtime environment or component, where the business process instance 202 (a runtime instance of the business process model 201) is then executed. In order to aid in the description, these portions At 310, a logging granularity rule set associated with the identified business process model is identified. In some instances, the logging granularity rule set may be identified based on a corresponding business process ID, where the ID of the business process model is compared to a set of logging granularity rules in order to identify the appropriate rule set associated with the business process model. In some instances, instead of an ID, a process category may be used to determine the appropriate set of logging granularity rules. In one example, sales process, manufacturing processes, and support processes may be associated with different sets of rules, where appropriate. Additionally, the identified granularity rule set may apply to two or more business process models, with information defining the particular logging granularities to be applied to various entities within the identified business process model. In other instances, a particular logging granularity rule may associate a single, common, logging granularity to each entity within the business process model. In still other instances, different packages or subsets of entities within a particular business process model may be assigned different levels of granularities, where nested processes or events and sub-flows inherit one or more of the logging granularities of their parent entities or events.

At 315, the identified business process model and its various entities are parsed. Parsing the business process model and its entities may generate a catalog or listing of entities, hierarchy levels, and other information associated with the identified business process model. Based on the parsing of the business process model and its entities, one or more properties associated with a particular entity in the parsed business process model can be identified at 325. In some instances, the primary entity property may be the entity type, such as whether the entity is a gateway, an activity, an event, or another entity type. A further property may be what type of gateway, activity, or event the particular entity is. The identified properties may be directly associated with (or defined within) a particular entity. Additionally or alternatively, one or more properties associated with a particular entity may be based on properties associated with the entire business process model. These properties can then be used at 325 to assign a logging granularity level to the particular entity.

At 325, a granularity level is assigned to the entity based at least in part on at least one of the entity's identified properties. In some instances, one or more rules from the logging granularity rule set may correspond to the various properties of the entity. In some instances, the logging granularity rule set may define a hierarchy, or ranked set of rules, such that rules higher on the hierarchy, or higher ranked, are assigned before the lower rules. Alternatively, one or more properties associated with the overall business process model or particular BPM instance may be used to assist in determining the appropriate logging granularity for the entity. In some instances, the particular business process model as a whole and its related attributes, including a classification or category of the business process model, may be a property of the entity that is used to determine the appropriate logging granularity to assign. Additionally, combinations of multiple properties associated with the entity may be used to identify the correct logging granularity rule to apply to the entity.

At 330, a determination is made as to whether manual modifications to the assigned logging granularity are received from the user. Users, administrators, and others with appropriate permissions and authorization may manually change the automatically assigned logging granularities according to the needs or desires of a particular model. In those instances, the change may be made via a graphical user interface presenting information, models, and logging granularities associated with the business process application. If no modifications are received, method 300 continues at 345. If, however, a modification to the entity's logging granularity is received, method 300 moves to 335 where the logging granularity assignment is modified for the entity according to the manual assignment provided. At 340, metadata associated with the entity and the logging granularity rule set can be updated for future use. In some instances, the information may be used in a computer-learning mechanism that can allow the business process application (and/or the analytical rule update engine 144 illustrated in FIG. 1) to update the logging granularity rule set if a suitable, or threshold, number of modifications to a particular assignment are made. The metadata can be analyzed on a regular, periodic, or real-time basis to calculate and/or determine when one or more logging granularity rules are to be modified, changed, or updated according to one or more actions taken by users. For example, if the logging granularity rule for a particular activity assigns a first granularity to the activity, but users manually change the assignment to a second granularity in a certain threshold percentage of uses (e.g., 65% of cases), the logging granularity rule may be modified by the system to automatically assign the particular activity to the second granularity assignment. Once the metadata is updated, method 300 continues at 345.

At 345, the logging granularity assignment associated with the entity is stored. In some instances, the logging granularity assignment may be stored in a temporary storage or cache until the completion of the entity logging granularity assignment process. In some instances, the logging granularity assignment may be associated with the particular entity in a particular business process model, or as an entry or portion of the metadata defining the particular entity. Alternative methods of storing the logging assignment may be used, as appropriate. In some instances, the logging granularity assignments may be stored as part of the business process model.

At 350, a determination is made as to whether additional entities remain to be assigned logging granularities within the business process model associated with process 300. If there are additional entities to be assigned, method 300 returns to

320 and performs the operations for the next entity in the business process model or instance. In some instances, the logging granularity assignment process can be performed concurrently or in parallel for each entity within the business process model, while in other instances, the assignments can occur sequentially. In some instances, a sequential assignment may be more appropriate when one or more of the entity's logging granularity depends on the assignment of one or more entities located before those entities in the business process model's operations or flow. Additionally, the process may run incrementally for each added and/or updated entity with the business process model. If there are no additional entities to be assigned, method 300 continues at 360.

At 360, the updated business process model can be stored. In some instances, the underlying business process model can be stored with the logging granularity assignments included in the model itself, while in others, the granularity assignments may be stored within a separate file or location so that the underlying business process model remains unchanged. Alternatively, the logging granularity assignments may be stored as part of the business process model (or in a particular version of the business process model) so the assignments are available for all future uses of the business process model.

At 365, a determination is made as to whether the business process model (or a particular associated instance) is updated or modified. If no updates have been made, method 300 continues to check for updates or modifications. However, if an update or modification is identified, method 300 can return to 310 where the business process model is re-parsed and the operations to assign the granularity to the various entities are repeated, as well as the determination as to the appropriate logging granularity rule set to apply to the business process model. In some instances, only the modified or updated entities within the business process model may be fully processed by the operations of method 300. In other instances, the entire set of described operations may be performed.

FIG. 4 is a flowchart of an example process 400 for determining, at runtime, a process logging level to apply to a particular logged event associated with the execution of a particular business process entity. As described, one or more entities within a business process model or instance can be assigned a dynamic logging level to be determined at runtime. Process 400 describes the operations performed at runtime in determining the appropriate logging level to be assigned to the associated entity based at least in part on a previously assigned logging granularity level assigned to the associated entity or business process model.

At 405, a particular instance of the business process model is executed. At 410, the instance of the first entity to be executed is identified, including information on the assigned logging granularity for that entity (as assigned, for instance, by process 300 described in FIG. 3). At 415, a log level associated with the identified entity instance is identified. The log level can be identified based on a review of one or more rule sets associated with the business process instance. Further, the appropriate log level may be determined based on the entity's previously assigned logging granularity level. At 420, a determination is made as to whether the log level of the entity is dynamically determined at runtime or a static value. If the log level of the identified entity is static, method 400 continues at 422, where the static log level is associated with the identified entity instance. Once the static log level is associated with the entity instance, method 400 continues at 440. If, however, it is determined at 420 that the present entity is associated with a dynamic log level, method 400 continues at 425.

At 425, the criteria associated with the dynamic log level of the entity is determined. In some instances, the dynamic log level may be defined by a logical expression to evaluate one or more runtime context variables or information, the logging granularity level assigned at design-time, and/or other relevant data. Based on the evaluation of the logical expression, an appropriate dynamic log level can be determined. Other suitable dynamic, runtime-related log level criteria can be defined, including criteria that may be associated with data or information gathered during the execution of one or more prior entities or events within the business process instance. In still other instances, the dynamic log level may be associated with information defined for the business process instance itself, such as the user or administrator initiating the business process instance, or the purpose of the business process instance. Additional contextual information may be considered when determining the appropriate log level for a particular entity, including consumed resources, received events, the previous course of process execution, and the current state of the process instance, among others.

At 430, the identified criteria is compared with information associated with the business process instance or other metadata or information associated with the executing instance of the business process instance or entity. Using the results of the comparison, the appropriate log level is set for the entity at 435. At 440, logging information corresponding to the log level of the current entity instance is collected.

At 445, a determination of whether additional entities remain to be processed during the execution of the business process instance is made. If additional entities remain, method 400 returns to 410 and processes the next entity accordingly. If, however, no additional entities remain, method 400 continues at 450 where execution of the business process instance is completed. While not illustrated in FIG. 4, the collection of logging information at 440 may include providing the logging information to a process log (such as the process log 126 illustrated in FIG. 1) or to a component within a logging system to filter the logging information based on one or more filtering rules (such as the log filter engine 141 illustrated in FIGS. 1 and 2B).

Figure 5:
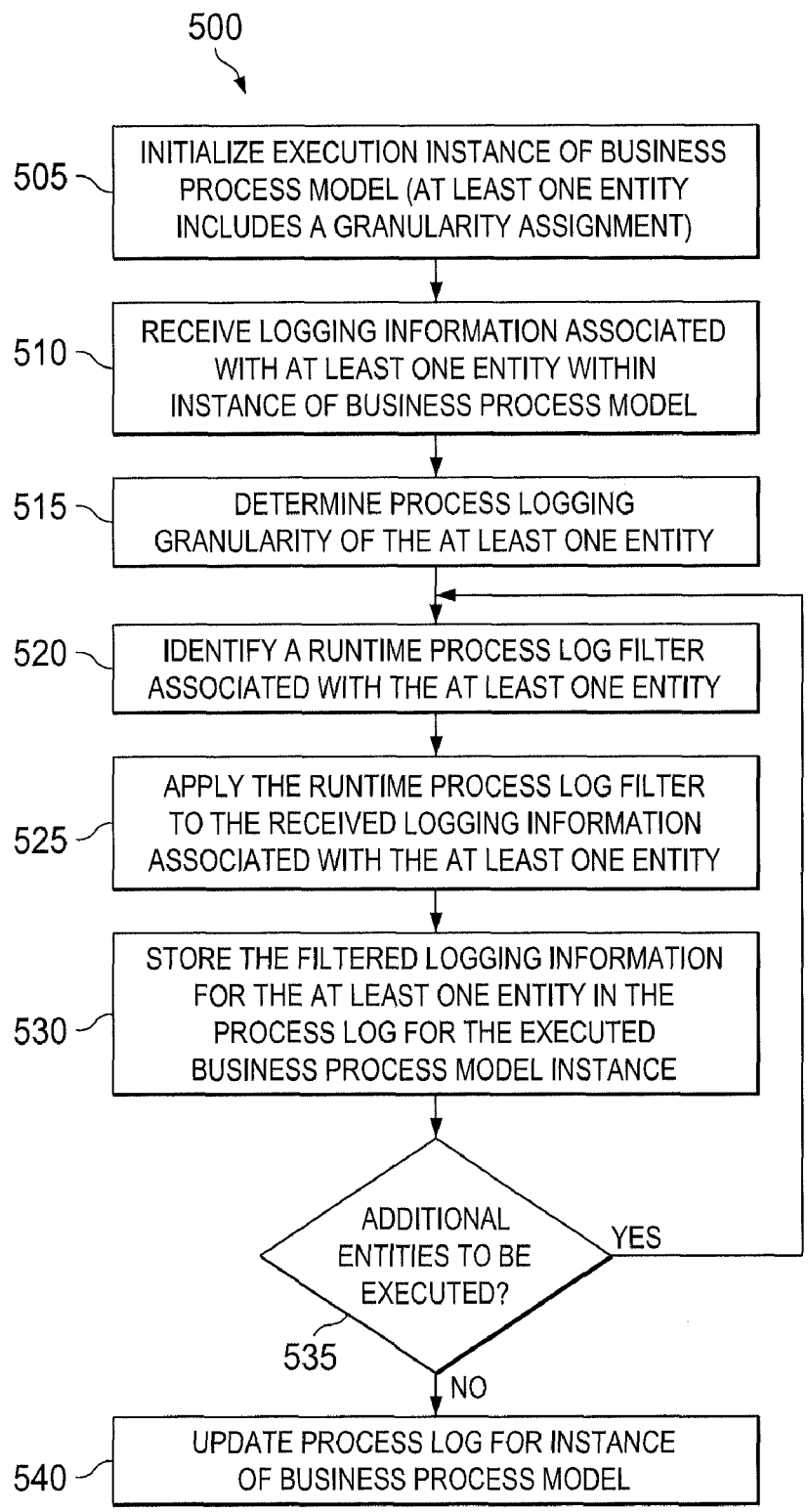
FIG. 5 is a flowchart of an example process for applying runtime process log filters to at least one set of process log information received during the execution of a particular business process.

FIG. 5 is a flowchart of an example process 500 for applying runtime process log filters to at least one set of process log information received during the execution of a particular business process instance. In some instances, method 500 can be used in conjunction with methods 300 and 400 of FIGS. 3 and 4, respectively, combining functionality to limit the amount of logging information collected and stored in a process log. Various combinations, permutations, and derivations of the illustrated methods can also be used, as appropriate.

At 505, execution of an instance of a business process model is initiated. In some instances, at least one entity in the business process model will include a logging granularity assignment. At 510, logging information associated with the execution of at least one entity within the executing instance of the business process model is received. The logging information may include the data related to the event associated with the entity, as well as the entity or event's logging granularity level. In some instances, the logging information may be initially received through a runtime logging module (e.g., runtime logging module 135 of FIG. 1) and passed through or sent to a filtering engine or component (e.g., log filter engine 141 of FIG. 1). In some instances, the logging information may represent a subset of the information generated or associated with the executed entity, where the subset of the information represents a set of logging information collected based at least in part on a logging granularity assignment from a method or process similar to those described herein.

At 515, the logging granularity of the entity is determined. In some instances, the assigned logging granularity may be used as part of a determination as to which or what logging information to be filtered or not. In other instances, the filtering operations may be separate or distinct from a particular logging granularity assigned to the entity. Additionally, a particular entity may not have an assigned logging granularity. In those instances, a default assigned logging granularity can be assumed or used for the purposes of process 500

At 520, a runtime process log filter associated with the entity is identified. The runtime process log filter may be associated with the entity based on one or more rules from a filter log rule set. In some instances, the associated filter rule(s) may be associated with a particular type of entity, with a particular entity instance, with a particular business process model, with a particular business process model instance, or with a particular purpose for executing the entity (i.e., tracing information associated with the business process instance, testing the operations of the business process instance, or any other related activities). Still further, the filtering rule to be applied to a particular entity may be at least in part based on a particular logging granularity assigned to that particular entity at design-time, whether by the automatic logging granularity assignment process described above or on a manually assigned (or default) logging granularity. Additionally, dynamic log filters can be associated with a particular entity, including logical expressions associated with the runtime context of the particular entity. For example, one expression may require a particular set of metadata to include the word "error" for a set of logging information to be stored in the process log. If the word "error" is not included, the runtime log filter engine can ignore the logging information and continue to the next entity. Alternatively, the log filter rules can further limit the type of information to be stored in the process log from the information received from the entity. In other words, if the logging information received from a particular entity at runtime includes the elements X, Y, and Z, the filter log rule may state that if element Z is a particular value, then only elements Y and Z will be stored, whereas otherwise, each of the elements X, Y, and Z may be stored. In some instances, a general filter rule may apply if log level of the runtime process log filter exceeds a particular level or value. The particular information stored after the general filter rule is applied may be determined at least in part based upon a rule or determination as to what information from a set of logging information (or "event payload") is to be logged. Any suitable filtering rule can be associated with a particular entity, and in some instances, to a plurality of entities.

At 525, the runtime process log filter rule is applied to the received logging information associated with the entity. In other words, the filter rule determined to be associated with the executed entity is evaluated, with the logging information meeting the requirements or specifications of the log filter rule being retained or maintained, while the remaining information may be removed from the set of logging information, ignored, or otherwise discarded. At 530, the filtered logging information for the entity is stored in the process log (i.e., process log 126 of FIG. 1) associated with the executed business process instance. In some instances, storing the filtered logging information in the process log includes adding a process instance identifier or other identifying information that can allow a reviewing user or system to understand that the logged information is associated with a particular process instance execution. The process instance identifier can then provide for coherence and relationships between successive logging events that would otherwise be isolated from each other and failing to provide a full audit trail. Using the process instance identifier, information from multiple entities and events can be related to one another and aggregated to provide a full set of information for a particular instance's execution. Additionally, information about the type of execution may be included in the process log, such as the reason for the test, the initiating individual, system, or entity, as well as other appropriate information.

At 535, a determination is made as to whether additional entities are included in the business process instance and whether they are to be executed. If additional entities are included and will be executed in the data flow of the business process instance, then method 500 returns to 520, where the appropriate rule for the next entity is determined. If, however, no additional entities are to be executed, method 500 concludes at 540, where the process log for the executing business process instance is updated and finalized. Where all logging information has been logged through multiple instances of 530, no updates or finalization may be necessary at 540. In some instances, the operations of 540 may allow for batching of logging results where multiple process entities are executed in the same transaction.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for filtering business process logging information at runtime, the method comprising:

receiving a set of logging information associated with execution of at least one entity, the at least one entity associated with a business process model defining a set of business process entities for performing a defined business process;

identifying a process log filter rule associated with the at least one entity;

assigning a logging granularity to the identified process log filter rule, wherein identifying the process log filter rule associated with the at least one entity including identifying a particular process log filter rule from a set of process log filter rules based at least in part on the logging granularity assigned to the at least one entity;

applying the identified process log filter rule to the received set of logging information to generate a filtered set of logging information associated with execution of the at least one entity; and storing the filtered set of logging information in a process log associated with the execution of the at least one entity.

2. The method of claim 1, wherein identifying the process log filter rule associated with at least one entity includes:
identifying at least one entity property associated with the at least one entity; and
determining at least one process log filter rule corresponding to the at least one identified entity property.

3. The method of claim 1, wherein the filtered set of logging information comprises an empty set of logging information associated with execution of the at least one entity, the empty set of logging information generated when the received set of logging information is filtered by the identified process log filter rule.

4. The method of claim 1, wherein storing the filtered set of logging information in the process log includes:
generating an identifier associated with the at least one entity; and
storing the filtered set of logging information in the process log, wherein the filtered set of logging information includes the generated identifier associated with the at least one entity.

5. The method of claim 1, wherein the process log filter rule associated with the at least one entity includes a process log filter rule associated with each entity in the business process model.

6. The method of claim 1, wherein the process log filter rule associated with the at least one entity includes a process log filter rule associated with each entity in a particular executing instance of the business process model.

7. The method of claim 6, wherein the process log filter rule is based at least in part on a runtime context associated with the particular executing instance of the business process model.

8. The method of claim 7, wherein the runtime context associated with the particular executing instance of the business process model includes a defined purpose for the execution of the business process model instance.

9. The method of claim 1, wherein the at least one entity is assigned a logging granularity at design-time, and wherein identifying the particular process log filter rule from the set of process log filter rules based at least in part on the logging granularity assigned to the at least one entity is performed at design-time.

10. The method of claim 1, wherein the process log filter rule includes a logical expression based on at least one entity property associated with the at least one entity used to determine a set of filter information for the at least one entity at runtime.

11. A computer program product for filtering business process logging information at runtime, the computer program product comprising computer readable instructions embodied on tangible, non-transitory media, the instructions configured, when executed, to:
receive a set of logging information associated with execution of at least one entity, the at least one entity associated with a business process model defining a set of business process entities for performing a defined business process;
identify a process log filter rule associated with the at least one entity;
assign a logging granularity to the identified process log filter rule, wherein identifying the process log filter rule associated with the at least one entity including identifying a particular process log filter rule from a set of process log filter rules based at least in part on the logging granularity assigned to the at least one entity;
apply the identified process log filter rule to the received set of logging information to generate a filtered set of logging information associated with execution of the at least one entity; and
store the filtered set of logging information in a process log associated with the execution of the at least one entity.

12. The computer program product of claim 11, wherein identifying the process log filter rule associated with at least one entity includes:
identifying at least one entity property associated with the at least one entity; and
determining at least one process log filter rule corresponding to the at least one identified entity property.

13. The computer program product of claim 11, wherein the filtered set of logging information comprises an empty set of logging information associated with execution of the at least one entity, the empty set of logging information generated when the received set of logging information is filtered by the identified process log filter rule.

14. The computer program product of claim 11, wherein storing the filtered set of logging information in the process log includes:
generating an identifier associated with the at least one entity; and
storing the filtered set of logging information in the process log, wherein the filtered set of logging information includes the generated identifier associated with the at least one entity.

15. The computer program product of claim 11, wherein the process log filter rule associated with the at least one entity includes a process log filter rule associated with each entity in the business process model.

16. The computer program product of claim 11, wherein the process log filter rule associated with the at least one entity includes a process log filter rule associated with each entity in a particular executing instance of the business process model.

17. The computer program product of claim 16, wherein the process log filter rule is based at least in part on a runtime context associated with the particular executing instance of the business process model.

18. The computer program product of claim 17, wherein the runtime context associated with the particular executing instance of the business process model includes a defined purpose for the execution of the business process model instance.

19. The computer program product of claim 11, wherein the at least one entity is assigned a logging granularity at design-time, and wherein identifying the particular process log filter rule from the set of process log filter rules based at least in part on the logging granularity assigned to the at least one entity is performed at design-time.

20. The computer program product of claim 11, wherein the process log filter rule includes a logical expression based on at least one entity property associated with the at least one entity used to determine a set of filter information for the at least one entity at runtime.

21. A system, comprising:
a memory configured to store a plurality of business process models, each business process model defining a set of business process entities for performing a defined business process; and
one or more processors configured to execute computer readable instructions to:
receive a set of logging information associated with execution of at least one entity, the at least one entity associated with a particular business process model from the plurality of business process models;

identify a process log filter rule associated with the at least one entity;

assign a logging granularity to the identified process log filter rule, wherein identifying the process log filter rule associated with the at least one entity including identifying a particular process log filter rule from a set of process log filter rules based at least in part on the logging granularity assigned to the at least one entity;

apply the identified process log filter rule to the received set of logging information to generate a filtered set of logging information associated with execution of the at least one entity; and store the filtered set of logging information in a process log associated with the execution of the at least one entity.

22. The system of claim 21, wherein the at least one entity is assigned the logging granularity at design-time, and wherein identifying the particular process log filter rule from the set of process log filter rules based at least in part on the logging granularity assigned to the at least one entity is performed at design-time.

* * * * *